(12) United States Patent
Stout

(10) Patent No.: US 7,249,437 B2
(45) Date of Patent: Jul. 31, 2007

(54) METHOD AND APPARATUS FOR EXTERMINATING GOPHERS AND OTHER BURROWING PESTS

(75) Inventor: James V. Stout, Prunedale, CA (US)

(73) Assignee: SoundStarts, Inc., Aromas, CA (US)

( * ) Notice: Subject to any disclaimer, the term of this patent is extended or adjusted under 35 U.S.C. 154(b) by 569 days.

(21) Appl. No.: 10/448,569

(22) Filed: May 29, 2003

(65) Prior Publication Data
US 2004/0211110 A1    Oct. 28, 2004

Related U.S. Application Data

(60) Provisional application No. 60/465,301, filed on Apr. 24, 2003.

(51) Int. Cl.
*A01M 13/00* (2006.01)
(52) U.S. Cl. ...................................................... 43/124
(58) Field of Classification Search .................. 43/124, 43/129
See application file for complete search history.

(56) References Cited

U.S. PATENT DOCUMENTS

| | | | | |
|---|---|---|---|---|
| 1,174,904 A | * | 3/1916 | Scoot .......................... | 43/124 |
| 1,290,544 A | * | 1/1919 | Graumann .................... | 43/124 |
| 1,401,292 A | * | 12/1921 | Van Meter .................... | 424/40 |
| 1,419,653 A | * | 6/1922 | Van Meter .................... | 422/111 |
| 1,492,732 A | * | 5/1924 | Knopf ......................... | 43/124 |
| 1,727,457 A | * | 9/1929 | Van Meter .................... | 43/127 |
| 2,906,056 A | * | 9/1959 | Youngblood .................. | 43/124 |
| 3,162,152 A | * | 12/1964 | Regenstein, Jr. et al. ... | 111/118 |
| 4,005,976 A | * | 2/1977 | Rombach et al. ............. | 431/13 |
| 4,026,330 A | * | 5/1977 | Dunn ......................... | 138/103 |
| 4,534,128 A | * | 8/1985 | Query et al. ................ | 43/132.1 |
| 4,594,807 A | * | 6/1986 | McQueen .................... | 43/132.1 |
| 4,648,202 A | * | 3/1987 | Renth ......................... | 43/132.1 |
| 4,756,118 A | * | 7/1988 | Evans, II .................... | 43/132.1 |
| 5,122,364 A | * | 6/1992 | Portas ......................... | 424/40 |
| 5,678,352 A | * | 10/1997 | Leitner et al. ................ | 43/125 |
| 5,860,243 A | * | 1/1999 | Stager ......................... | 43/124 |

OTHER PUBLICATIONS

U.S. Appl. No. 60/465,301, James V. Stout, Priority Claim.

* cited by examiner

*Primary Examiner*—Kurt Rowan
(74) *Attorney, Agent, or Firm*—Donald R. Boys; Central Coast Patent Agency, Inc.

(57) ABSTRACT

An agent delivery system for eradicating rodents in an underground system of tunnels has a first chamber containing a first agent for delivery, a second chamber containing a second agent for delivery, a powered airflow device fitted to both chambers, and a tubing element fitted to both chambers for directing the agents into the tunnel system. Airflow produced from the airflow device flows into the first chamber causing displacement of the first agent there from and through the chamber and the tubing element, the first agent for destabilizing the target rodents, the airflow also directed through the second chamber causing displacement of the second agent there from and through the chamber and the tubing element, the second agent for killing the rodents destabilized by the first agent.

2 Claims, 2 Drawing Sheets

METHOD AND APPARATUS FOR EXTERMINATING GOPHERS AND OTHER BURROWING PESTS

CROSS-REFERENCE TO RELATED DOCUMENTS

The present invention claims priority to U.S. provisional patent application Ser. No. 60/465,301, filed on Apr. 24, 2003, disclosure of which is included herein by reference.

FIELD OF THE INVENTION

The present invention is in the area of rodent eradication and control, and pertains more specifically to methods and apparatus for delivering more than one agent in sequence into burrows and runs in order to effectively eradicate gophers and other rodents.

BACKGROUND OF THE INVENTION

Burrowing rodents, particularly gophers and some species of ground squirrels, are a serious problem for private homeowners and proprietors of many public commercial establishments, such as parks and golf courses and the like. Further, it is notoriously well known that there are many commercial solutions available to the general public for eradication and control of such pests. There are similarly many available traditional treatments, and much folklore associated with rodent and pest control in general. The inventor in the present case has caused a careful search to be made, and has presented, with this application, an Information Disclosure Statement (IDS) listing a number of patents and papers on the subject.

One primary method for controlling ground burrowing pests is to gas them with toxic smoke or a poisonous chemical agent. There are a variety of chemical or smoke producing implements and dispensing systems that are available on the market and purport to be successful in eradication gophers and like rodents. One such system is known to the inventor and described with reference to U.S. Pat. No. 6,247,265.

The method of Pat. No. 6,247,256 involves a pest exterminating apparatus, comprising a tank for storing anhydrous ammonia and a supply line connected to the tank for dispensing the anhydrous ammonia from the tank. The supply line can be connected to a gas valve in a gas dispensing position or a liquid valve in a liquid dispensing position. An elongate wand having a flexible tube mounted on a free end is connected to a dispensing end of the supply line for insertion of the flexible tube into a gopher's burrow. A person holding the supply line is spaced from the ammonia being dispensed due to the elongate wand. In use, the person positions the tank adjacent a gopher's burrow and inserts the flexible tube into the burrow. A lever on the dispensing end of the supply line allows a valve to be opened for dispensing a portion of the ammonia into the burrow. The tank may then be relocated adjacent another burrow.

Two other chemical agent-dispensing methods for killing rodents in their burrows are known to the inventor and referenced herein as U.S. Pat. No. 5,548,921 and U.S. Pat. No. 5,588,252. The first of these listed methods involves a probe that is provided for the purpose of locating a portion of an underground burrow. Once the burrow is located, it is breached to an extent that a dry chlorine material may be physically placed therein. Once placement of the chlorine material is accomplished, water is poured over the material to cause a chemical reaction producing chlorine gas. The second of the listed methods involves using an automobile engine exhaust as a gas dispensing system delivering the gas through a delivery tube into a portion of an underground burrow causing death to the animals by asphyxiation due to carbon monoxide poisoning.

The above-described systems, while effective in varying degrees some of the time, fail to treat the problem thoroughly. It is known to the skilled artisan that ground burrowing animals, especially gophers, use certain methods to protect themselves and their young from being compromised in their burrows by predators or by flooding, or even by smoke generated from grass or forest fires. False tunnels are constructed, for example, as predator decoy tunnels that lead nowhere and are not used. Runs that are in use have special chambers elevated well above the flood level of the run so that the animals can escape water inundation. Additionally, when a gopher, for example, feels threatened by a predator, including a human attempting to compromise the run it will, very quickly, plug up certain key passages that give access to it's young and to itself and will construct new passages or re-open the old passages to these chambers when the danger has passed. These tactics can be used to render the heretofore-mentioned methods somewhat, if not entirely, in some cases, ineffective. Even if some adults are killed, often the young are spared and quickly take over.

What is clearly needed is an efficient delivery system for dispatching ground-burrowing pests that can be used to administer a first fast-acting agent that will render the pests immediately inactive for an initial period while a second dispersal of a lethal agent is administered.

SUMMARY OF THE INVENTION

In a preferred embodiment of the invention an agent delivery system for eradicating rodents in an underground system of tunnels is provided, comprising a first chamber fitted with an inlet and an outlet passageway and containing a first agent for delivery, a second chamber fitted with an inlet and an outlet passageway and containing a second agent for delivery, a powered airflow device fitted to both chambers at the inlet passageways, and a tubing element fitted to both chambers at the outlet passageways for directing the agents into the tunnel system. The system is characterized in that airflow produced from the airflow device flows into the first chamber causing displacement of the first agent therefrom and through the chamber outlet passageway and the tubing element, the first agent for destabilizing the target rodents, the airflow also directed through the second chamber causing displacement of the second agent there from and through the chamber outlet passageway and the tubing element, the second agent for killing the rodents destabilized by the first agent.

In another aspect of the invention a method for eradicating rodents in an underground system of tunnels using a dual-agent delivery system having a first chamber containing a first agent and a second chamber containing a second agent and having a powered airflow device for directing airflow through the chambers and a tubing element for directing the agents into the tunnel system is provided, comprising steps of (a) positioning the tubing element into an entrance to the tunnel system; (b) powering on the airflow device to create airflow; (c) displacing the first agent from the first chamber through the tubing element; (d) activating the second agent; and (e) displacing the activated second agent from the second chamber through the tubing element.

BRIEF DESCRIPTION OF THE DRAWING FIGURES

DESCRIPTION OF THE PREFERRED EMBODIMENTS

A dual-agent delivery system is provided for the purpose of rodent control and eradication. The method and apparatus of the invention is described in detail below.

Figure 1:
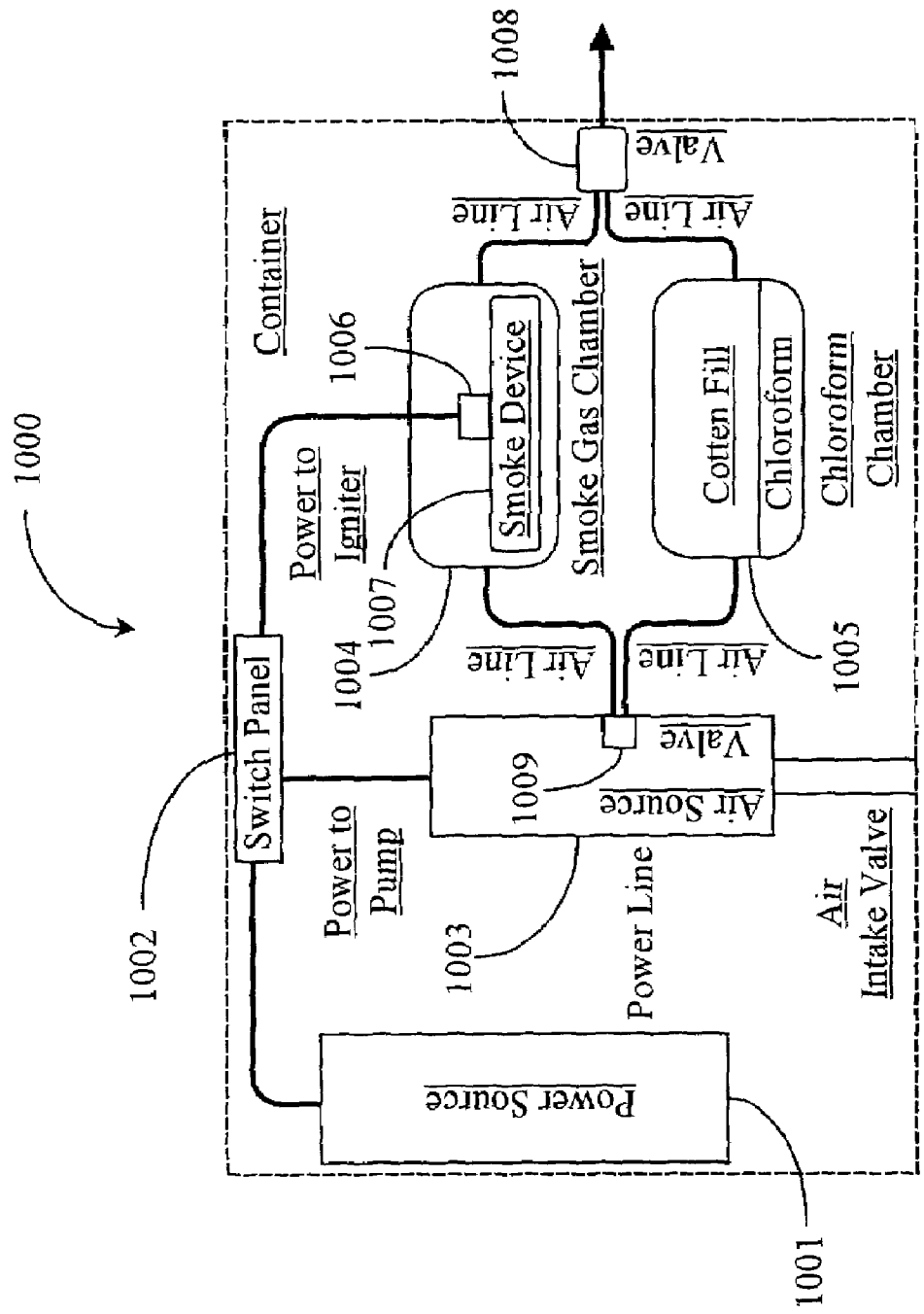
FIG. 1 is a block diagram illustrating a dual-agent delivery system for eradication of burrowing rodents according to a preferred embodiment of the present invention.

FIG. 1 is a block diagram illustrating a dual-agent delivery system 1000 for eradication of burrowing rodents according to a preferred embodiment of the present invention. Delivery system 1000 is in a preferred embodiment contained in an enclosure (illustrated as dotted rectangle) that has suitable openings provided therein (openings not shown) for component access, for example, refill agents when depleted and for maintenance purposes. The enclosure can be a box-like structure made of a durable polymer, wood, metal, or any other suitable material. In one embodiment, delivery system 1000 is contained in a portable enclosure adapted to be pulled on wheels or mounted to a cart, which is then tow able behind a vehicle of ATV. In still other embodiments, the enclosure can be adapted to be worn on a user's back similar to a backpack. There are many possibilities.

Delivery system 1000 has a power source 1001 provided therein and adapted to provide all of the power requirements of the system. Power source 1001 is in a preferred embodiment a re-chargeable battery cell. In another embodiment plug-in power sources can be used such as a vehicle plug-in adapter designed to allow system 1000 to be powered by a vehicle battery.

Delivery system 1000 has a switch panel 1002 provided there in and made accessible to a user as a user interface. Panel 1002 can have a variety of controls provided thereon without departing from the present invention. More detail regarding minimum user controls that are provided on panel 1002 will be provided later in this specification.

Delivery system 1000 uses air as an agent delivery vehicle. System 1000 is therefore equipped with a mechanical air delivery mechanism 1003 labeled Air Source in this example. Air source 1003 is in a preferred embodiment a compressor-type air pump that takes in air through a provided air intake valve (labeled as such) leading out of the system enclosure. A power line is provided from panel 1002 to pump 1003 to enable user control including on and off power states and, if equipped, different power settings related to the velocity of air released by the pump in operation. Pane 1002 also has a switch provided thereto for connecting and disconnection from power source 1001. Hence, a power line runs from power source 1001 to panel 1002. Panel 1002 is the power direction and control unit of delivery system 1000.

Air pump 1003 has a dual-passage valve 1009 seated therein at its outlet location. Valve 1009 is adapted to deliver air out of pump 1003 through one, or the other, or through both passages simultaneously. In one embodiment a user may control which passage air is released through from the point of panel 1002 assuming of course a suitable switch mechanism is provided for the purpose. In an alternate embodiment, valve 1009 is simply a single passage one-way valve.

Delivery system 1000 has a constructed enclosure or chamber 1004 provided therein and adapted to function as a gas or smoke box. In a preferred embodiment chamber 1004 is constructed from a durable metal such as aluminum or stainless steel. Other durable non-combustive materials may be used in the construction of chamber 1004. Chamber 1004 has an opening placed therein and adapted with fittings to accept one end of an airline leading from valve 1009 of pump 1003. The connected airline supplies compressed air from pump 1003 to chamber 1004. The airline from pump 1003 to chamber 1004 is, in a preferred embodiment made from stainless steel tubing. Copper tubing or aluminum tubing may also be used.

Chamber 1004 is adapted to hold in mounted position a smoke device 1007 similar to a "punk-stick" or other known type of rodent-repellant flare that is available in the marketplace. To that effect, chamber 1004 has a lid (not shown) adapted for the purpose of enabling installation and replacement of devices 1007. Smoke device 1007 typically contains a volatile substance, which when burned, produces a toxic sulpher-based smoke that is used to eradicate rodents including gophers. In a preferred embodiment, device 1007 is adapted for mounting within chamber 1004 such that it is mounted over an igniter component, illustrated herein as component 1006.

Component 1006 has electrodes provided thereto that function when powered to provide an ignition spark to ignite smoke device 1007. A power line is provided leading from panel 1002 to chamber 1004, or more specifically to igniter 1006. It is assumed in this example that an ignition button is provided on panel 1002 to enable power to the electrodes of igniter 1006. Igniter 1006 can serve as the mounting apparatus for smoke device 1007 wherein the device is impaled over the electrodes during installation. There are, as well, many other mounting arrangements possible without departing from the spirit and scope of the present invention. The smoke device comprises, in this example, one of the two delivered agents of the system.

Delivery system 1000 has a second chamber 1005 provided therein and adapted to contain liquid chloroform. Chamber 1005 is, in a preferred embodiment, constructed from a durable polymer to avoid caustic reaction from chloroform and metal. Chamber 1005 has an opening (not shown) provided therein adapted to enable a user to introduce a modest amount of liquid chloroform therein. The rest of the interior space of chamber 1005 is moderately packed with cotton fill to provide more surface area for the purpose of introducing the chloroform molecules into passing air.

Chamber 1005 has another opening provided therein at its inlet end adapted with fittings to accept the leading end of an airline fitted at the opposite end to valve 1009. The airline leading from valve 1009 to chamber 1005 provides controlled airflow into chamber 1005. Both chambers 1004 and 1005 have openings strategically located at their output ends, the openings adapted with fittings to accept additional airlines (one each) leading from the respective chambers, the opposite ends of the airlines fitted to a valve 1008 provided at the output end of the enclosure of system 1000. In a preferred embodiment all of the described airlines are installed with suitable fittings and seals to guard against agent leakage. Doors or lids of chambers 1004 and 1005 are also sealed to provide airtight containment of the respective agents of the system. Valve 1008 is, in a preferred embodiment, a one-way pressure valve that outputs agent to a delivery wand or hose apparatus (not shown) that is placed inside a rodent run during operation.

In a preferred embodiment of the present invention, delivery system 1000 is loaded with chloroform to a pre-specified amount in chamber 1005. A smoke device 1007 is installed within chamber 1004. Delivery system 1000 is then ready to be powered on for use. Air pump 1003 is activated from a suitable control switch on panel 1002. In one embodiment, pump 1003 simply supplies an even flow of air continuously through valve 1009, through immediate connected airlines into chambers 1004 and 1005 simultaneously. The airflow passes through the chambers into the second array of airlines to output valve 1008 and out of the system.

In the above-described use embodiment, the air passing through chamber 1005 picks up chloroform molecules and passes them out of the system for delivery into a rodent run for an initial period before smoke device 1007 is ignited. The purpose of this process order is to first introduce the chloroform as a sweet smelling and fast acting agent to render the adult rodents in a disabled state. The chloroform disables the rodents very quickly in a "knockout" phase so that they cannot act to protect any important passages of the run by plugging them. The knockout phase of the process lasts approximately 20 to 30 seconds depending on the size of the run and estimated number of rodents using the run. More or less time may be applicable.

The second phase of the process is the eradication phase wherein smoke device 1007 is ignited from a suitable ignition button on panel 1002. Once smoke device 1007 ignites, it flares and produces a copious amount of sulpher-dioxide smoke that is immediately carried into the run following the chloroform. The smoke from device 1007 may also contain other toxins depending on the brand used. The smoke permeates the run reaching the already disabled rodents and kills them. The young of the rodents, usually tucked away in a special chamber are also vulnerable to the smoke because the adults do not have sufficient time to plug it for protection.

In another embodiment of the present invention, valve 1009 is adapted as a two-way valve that can shut off completely and that during operation opens only one air passage through system 1000 at a time. In this embodiment, pump 1003 is pressurized to a certain extent before activation. Upon releasing valve 1009 to open the air passage through chamber 1005, compressed air is delivered as a shot of air that rushes quickly through chamber 1005 and out of valve 1008 through a hose or wand and into the run. In this case, the air picks up less chloroform, but the chloroform is delivered much faster into the run. Optionally, air pressure may be allowed to build up in chloroform chamber 1005 in order to deliver a fast and sustained blast of air with maximum chloroform into the run.

In the use embodiment described immediately above, the second pressurized blast is directed through chamber 1007 after it is full of smoke from ignition of device 1007. Valve 1008 can similarly be used to allow pressure to build up somewhat in chamber 1007 before delivering the smoke into the run.

The differences in the use cases described are simply that in one case, chloroform is first delivered in a sustained flow followed by smoke that joins the same airflow when present. The chloroform is not prevented from flowing after the smoke is being delivered as in all likelihood the time required to permeate an entire run will deplete the chloroform. Only a small amount of chloroform (enough for one run) is placed in chamber 1005 before operation such that it is completely used during one application.

The other described case using pressure building delivers one agent then the other using a more powerful blast of air for a shorter duration. In this embodiment the smoke device and the amount of chloroform introduced is depleted during each application. On a particularly long run, parts of the run may be sealed and treated before re-loading and moving to a second portion of the same run.

In still another embodiment, system 1000 may be configured for both use case scenarios. Depending on need assessed at the site of the gopher or rodent run the user can utilized either the steady airflow mode, or the pressurized blast mode. There are many configurations possible that may be controlled from panel 1002, including increasing or decreasing airflow velocity both in steady and in pressurized mode.

Figure 2:
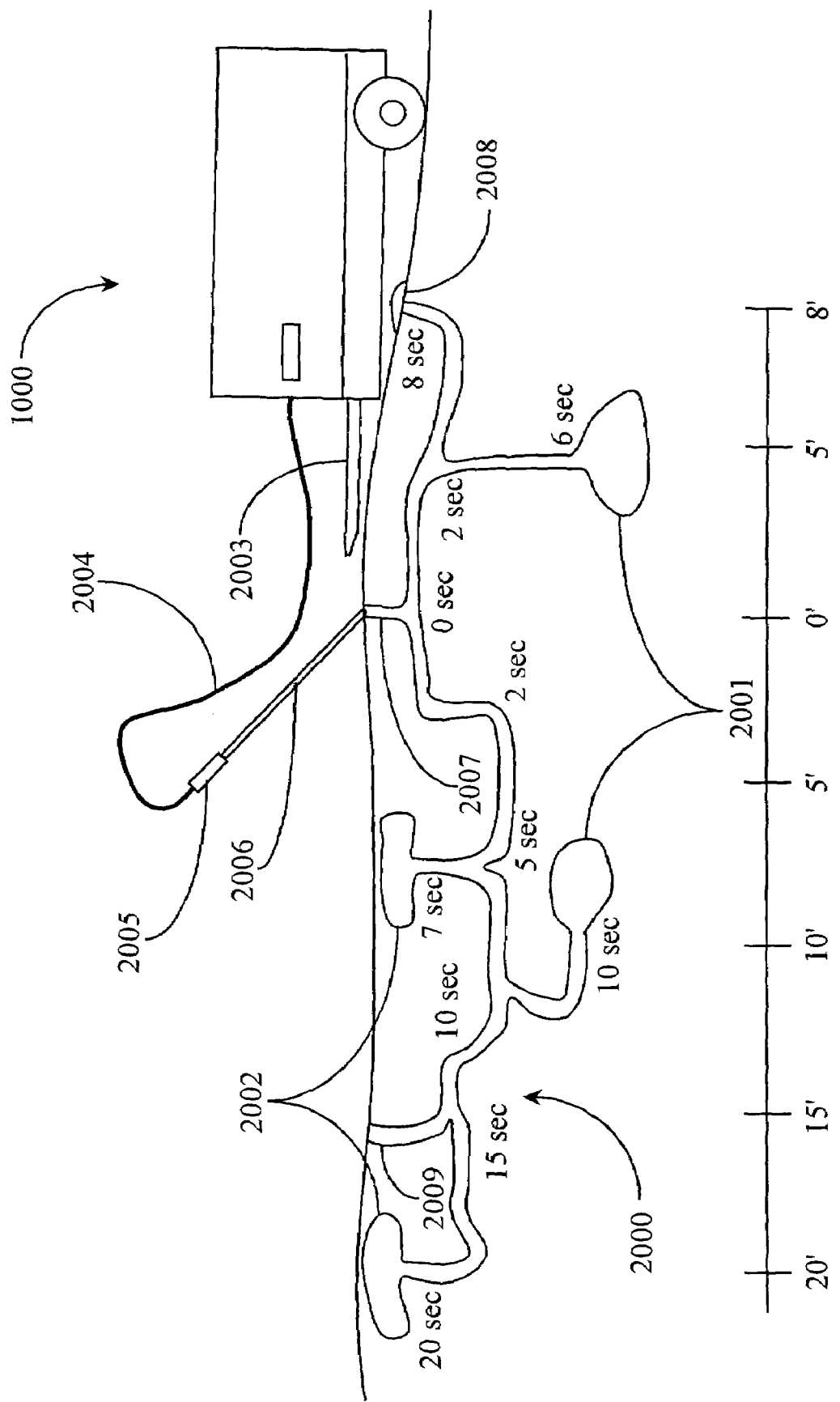
FIG. 2 is a use diagram illustrating application of dual agents according to one embodiment of the present invention.

FIG. 2 is a use diagram illustrating application of chloroform into a rodent run in a fast knockout phase according to one embodiment of the present invention. Delivery system 1000 as previously described above is contained by an enclosure that can be adapted as a wheeled cart or provided in a form to be mounted to a wheeled cart, hand truck or similar apparatus as illustrated in this example of a wheeled cart having a tow-bar or pull handle 2003 affixed thereto.

In some embodiments, system 1000 can be carried in by handles provided to the enclosure, or may be of the form of a contained pack that can be worn in similar to a backpack. Delivery system 1000 can be provided as a relatively lightweight system or a more commercially sized system for covering larger runs or heavily populated runs spanning over larger than normal ground areas. The size of chambers and pumps as well as the rating of the power source and the initial amounts of agent loaded therein for delivery can be varied accordingly.

Agent delivery is accomplished using a delivery wand 2006 having a grip handle 2005 and a delivery hose 2004 fitted thereto and fitted at the other end to the outlet valve (1008) described with reference to FIG. 1. Handle grip 2005 may in some embodiments be equipped with certain user controls as was described above for panel 1002 of FIG. 1 provided a power line is bundles along with the length of delivery hose 2004. Also in one embodiment, wand 2006 and hose 2004 may be dual-passage enabled meaning that one agent may be delivered through one dedicated passage while the other agent is delivered through a second passage. However, since air is the delivery vehicle in this case and chloroform is mixed with the air inside the unit and delivered alternately with the smoke gas, one passage is all that is required for hose 2004 and wand 2006.

An exemplary gopher run 2000 is illustrated in this embodiment having features typical thereof. Run 2000 may also be a run used by another type of ground burrowing pest. The features of run 2000, however, are more typical of gophers. Run 2000 has two types of run chambers. These are lower chambers 2001 and elevated chambers 2002. Elevated chambers 2002 are protective chambers usually dedicated to rearing of young, storage of food, and as escape chambers in the event of a flood. Lower chambers 2001 are, more typically used to escape from or to hide from digging predators and are protective in these instances because of their greater depth. Chambers 2001 may also be used for rearing young.

Chambers 2002 and 2001 can be quickly sealed off from tunnel access by adult gophers in the event of attack by predator or other sensed danger. The ability of adults to quickly seal off these important areas of the run is remarkable and in most cases is the reason many prior-art methods of eradication are not entirely effective. Adults immediately pick up gases that have strong odors before they can take effect and move instinctively to protect themselves by plugging important chambers and isolating themselves against the inundation.

Empirical testing has found that the adult gophers do not react in a defensive manner to introduction of chloroform because it is not foul smelling. Further, the method of delivery wherein a large surface area of chloroform enables adequate mixing of the molecules with air provides equal distribution of chloroform in the delivery gas (air/chloroform) and quickly reaches both elevated and lower chamber areas.

Run 2000 has three entrances illustrated herein as entrance 2007, entrance 2009, and entrance 2008. It is noted herein that entrance 2008 is plugged before beginning the introduction of chloroform into the run. This is a consideration that is made after evaluating a run. For example, if 2 entrances are very close together, plugging one of them prevents chloroform from escaping immediately after introduction. Entrance 2009 is left un-plugged in this example only to illustrate that it may be desired to leave one far entrance open to aid airflow through the run.

In practice of the present invention, a user operating wand 2006 and system 1000 powers on the system and positions the wand to engage an entrance to the run, in this case, entrance 2007. The user then opens the airflow containing the chloroform, which is delivered into the run. It was described above that a typical amount of time for delivering the chloroform agent is approximately 20 seconds. An exemplary time of coverage indication is logically provided herein for approximate length in feet for the architecture of the illustrated run 2000.

A scale measured by units of feet is illustrated beneath run 2000 and generally aligns at 0 feet with entrance 2007. The scale indicates that run 2000 is approximately 28 feet in length. Of course, runs may be longer or shorter in length, however around 30 feet is a good average. Chloroform agent mixed with air can travel an average approximate of 1 foot per second. Actual velocity depends on the force of air flowing into run 2000. For a steady flow it is estimated that 1-foot per second is adequate for operational purposes. Using the scale as a reference tool, the approximate areas of run 2000 are marked generally with the number of seconds from 0 it takes the chloroform to travel somewhat horizontally until the entire run area is reached at a velocity of 1-foot per second. By choosing an entrance closer to the center of run 2000, the amount of time to cover the furthest reach from entrance 2007 is approximately 20 seconds. System 1000 can in some embodiments be fined tuned so that the airflow velocity is high enough to permeate the run before the rodents can act, but slow enough to insure that a sufficient amount of agent is delivered per unit of air. Variances in run architecture and choice of entrance used will affect the overall results but a general estimation of the time required to chloroform a particular run can be based on estimated length.

After the chloroform introduction is complete, a user ignites the smoke device of system 1000 with the wand still in place in the chosen entrance. The same velocity of airflow can be used to deliver the smoke. In some cases chloroform delivery and smoke delivery may overlap somewhat if the chloroform is not fully depleted from the chloroform chamber (1005, FIG. 1). In another embodiment the chloroform passage may be closed before igniting the smoke device for operation by employing a bi-chamber valve in the system architecture either immediately before or immediately after the agent chamber architecture. There are many possible airflow schemas that may be employed.

It will be apparent to those with skill in the art that there are many alterations that may be made in the embodiments described above while not departing from the spirit and scope of the invention. The spirit and scope of the present invention should be limited only by the following claims.

What is claimed is:

1. A system for killing rodents, comprising:
a delivery orifice for placing into an underground tunnel used by the rodents;
a first delivery mechanism delivering a first substantially odorless gaseous mixture to and through the delivery orifice for a first period of time, the first mixture specifically chosen to render the gophers unconscious, preventing the gophers in the tunnel from blocking the tunnel against further application of gaseous mixture; and
a second delivery mechanism delivering a second gaseous mixture to and through the delivery orifice for a second period of time, after the first gaseous mixture is delivered, the second gaseous mixture specifically chosen to kill the gophers rendered unconscious by the first gaseous mixture.

2. A method for killing rodents, comprising the steps of:
(a) placing a delivery orifice into an underground tunnel used by the rodents;
(b) delivering a first substantially odorless gaseous mixture to and through the delivery orifice for a first period of time, the first mixture specifically chosen to render the gophers unconscious, preventing the gophers in the tunnel from blocking tire tunnel against further application of gaseous mixture; and
(c) delivering a second gaseous mixture to and through the delivery orifice for a second period of time after the first gaseous mixture is delivered, the second gaseous mixture specifically chosen to kill the gophers rendered unconscious by the first gaseous mixture.

* * * * *